United States Patent
Brandt et al.

[15] 3,683,056
[45] Aug. 8, 1972

[54] METHOD FOR MAKING A PREPACKED SAND CONTROL LINER FOR USE IN OIL WELLS

[72] Inventors: Harry Brandt, 3309 Middle Golf Drive, El Macero, Calif. 95616; Barney R. Treadway, 5912 Durbridge Drive, New Orleans, La. 70114

[22] Filed: March 27, 1969

[21] Appl. No.: 811,140

Related U.S. Application Data

[63] Continuation-in-part of Ser. No. 376,638, June 22, 1964, abandoned.

[52] U.S. Cl. ................264/112, 117/98, 117/100, 117/113, 117/168, 166/228, 166/236, 264/133, 264/317
[51] Int. Cl. ...........................................E21b 43/08
[58] Field of Search ......156/215, 279; 166/278, 228, 166/296, 236; 117/98, 100, 115, 168; 264/128, 236, 326, 112, 113, 317

[56] References Cited

UNITED STATES PATENTS

| | | | |
|---|---|---|---|
| 1,595,811 | 8/1926 | Anderson | 156/184 |
| 1,627,209 | 5/1927 | Smith | 264/236 |
| 2,336,168 | 12/1943 | Eckel | 166/5 |
| 3,255,821 | 6/1966 | Curlet | 166/228 |
| 3,268,001 | 8/1966 | Brandt | 166/34 |

Primary Examiner—Robert F. Burnett
Assistant Examiner—D. J. Fritsch
Attorney—A. L. Snow, F. E. Johnston, R. L. Freeland, Jr. and E. J. Keeling

[57] ABSTRACT

A method for curing mixtures of particulate matter and a bonding agent in hot liquid baths to form the permeable section of a prepacked sand control liner for use in oil wells.

16 Claims, 3 Drawing Figures

INVENTORS
HARRY BRANDT
BARNEY R. TREADWAY
BY Edward ...
ATTORNEYS

3,683,056

METHOD FOR MAKING A PREPACKED SAND CONTROL LINER FOR USE IN OIL WELLS

This application is a continuation-in-part of application Ser. No. 376,638, filed June 22, 1964 and now abandoned.

This invention relates to prepacked sand control liners for use in oil wells and more particularly, this invention relates to a method of forming the permeable matrix portion of a prepacked sand control liner in a manner to provide exceptional strength and a removable protective coating.

In the oil producing art it is often necessary to control sand which undesirably flows into a producing well to allow for economical production of oil from the well. Sand control is often accomplished by placing a prepacked sand control liner in the well at a position adjacent the producing formation and then producing oil through the prepack. In one form a prepack is comprised of a permeable matrix formed by a particle pack consolidated around a slotted liner. An additional slotted liner is sometimes placed around the exterior of the permeable matrix. The permeable matrix allows well fluids from the producing formation to pass into the interior of the slotted liner and then up the production tubing to the surface. Sand and other particles are prevented from accompanying the produced well fluids by the permeable matrix both by filtering out undesirable particles and by causing bridging of undesirable particles.

Heretofore, the permeable matrix portion of a prepack was made by bonding particulate material together around a slotted liner with a bonding material of a suitable composition. One form of particulate material commonly used was sand. The bonding material and sand, for example, were mixed in appropriate proportions and the mixture formed around the slotted liner. The bonding material was activated by a suitable catalyst. The activated mixture formed about the liner was cured to consolidate the mixture to form a permeable matrix around the slotted liner.

It has also been known heretofore that prepacks often become plugged with drilling mud when the prepacks are being installed in a well. The drilling mud causes a filter cake to be formed on the permeable matrix which greatly reduces and may prevent fluid flow through the matrix. When a prepack in this condition arrives at the producing formation, fluid flow is reduced and in the extreme well fluids will not flow through the permeable matrix and thus the well cannot be produced. A method for preventing plugging of prepacks is described and claimed in application of Harry Brandt, Ser. No. 338,867 filed Jan. 20, 1964, and now U.S. Pat. No. 3,268,001. In that application a protective wax coating having a preselected melting temperature is applied to the prepack prior to running it down into the well to prevent drilling mud invasion of the prepack. The wax is preferably slowly oil-soluble and is selected to have a melting temperature less than the downhole temperature of the well where it is to be placed. The formation heat causes the wax to melt and thus be removable after the prepack is installed in the well. The method used heretofore to coat a prepack with wax was to apply hot wax to the permeable matrix of a prepack which had already been consolidated and to then allow the wax to harden.

It is a particular object of this invention to provide a method of forming a wax-coated prepack which combines curing the bonding material and coating the permeable matrix with wax in a single step.

In a broad aspect the method of the present invention includes the steps of forming a particle pack from particulate matter and mixing the particle pack with a heat curable bonding agent, curing the bonding agent in hot wax to cause the bonding agent to polymerize and consolidate the particle pack and then allowing the wax to cool in and around the particle pack to form a protective coating thereabout.

Further objects and advantages of the present invention will become apparent from the following detailed description read in light of the accompanying drawings which are a part of this specification and in which.

Figures 1, 2:
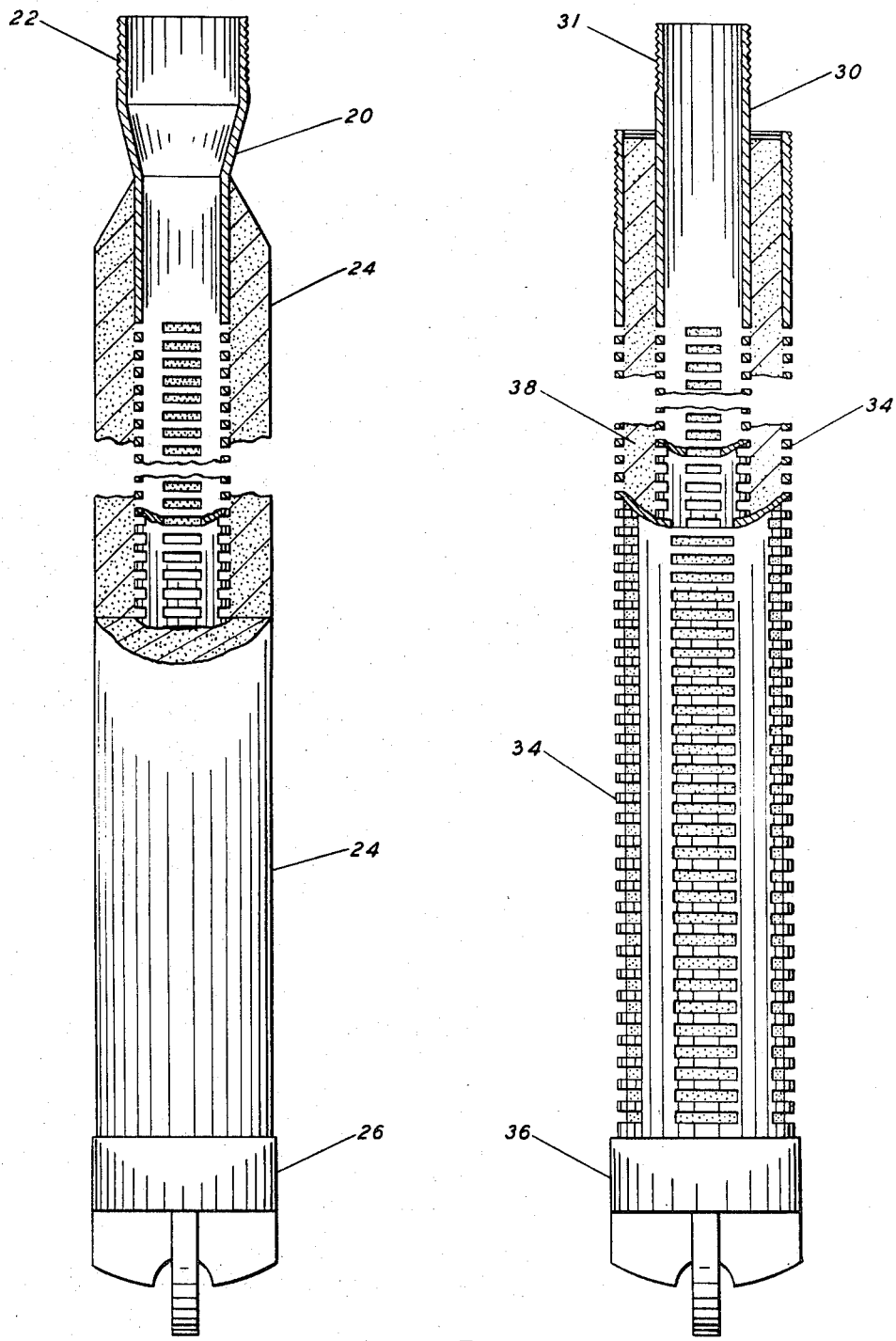
FIG. 1 is a longitudinal view partially in section and illustrates one embodiment of a prepacked sand control liner.
FIG. 2 is a longitudinal view partially in section and illustrates another embodiment of a prepacked sand control liner.

Referring now to FIG. 1, a prepacked sand control liner, commonly called a prepack, is shown. The prepack illustrated in FIG. 1 includes an interior slotted liner 20 which has a means, such as threaded portion 22, connectable to a string of producing tubing. A porous matrix section 24 is formed, for example, of sand grains cemented together by a bonding material. A suitable bonding material is a heat-curable epoxy resin. Other particles and bonding agents to form porous matrix means may be used in accordance with the present invention. The permeability of prepacks generally ranges from about 1 Darcy to 100 Darcies. A plug 26 having an opening for fluid flow therethrough, is connected to the bottom of the interior slotted liner 20. The plug allows fluid flow up the interior of the slotted liner 20 as the prepack is run in the well. The plug is provided with means for closing off the fluid flow passage when desired so that when the prepacked liner is placed adjacent to the producing formation all fluids produced will flow through the porous matrix 24 and then up the production tubing.

In FIG. 2 another embodiment of a prepack is shown. In this embodiment the prepack has an inner permeable or slotted liner 30 and means 31 thereon connectable to production tubing. An exterior slotted liner 34 is located concentrically around the inner slotted liner 30 and forms an annular chamber therewith to contain a porous matrix 38. A plug 36 is connected to the bottom of the slotted liners. The prepacks shown in FIGS. 1 and 2 are for illustrative purposes only and any suitable arrangement of permeable matrix means may be used in accordance with the method of the present invention.

Figure 3:
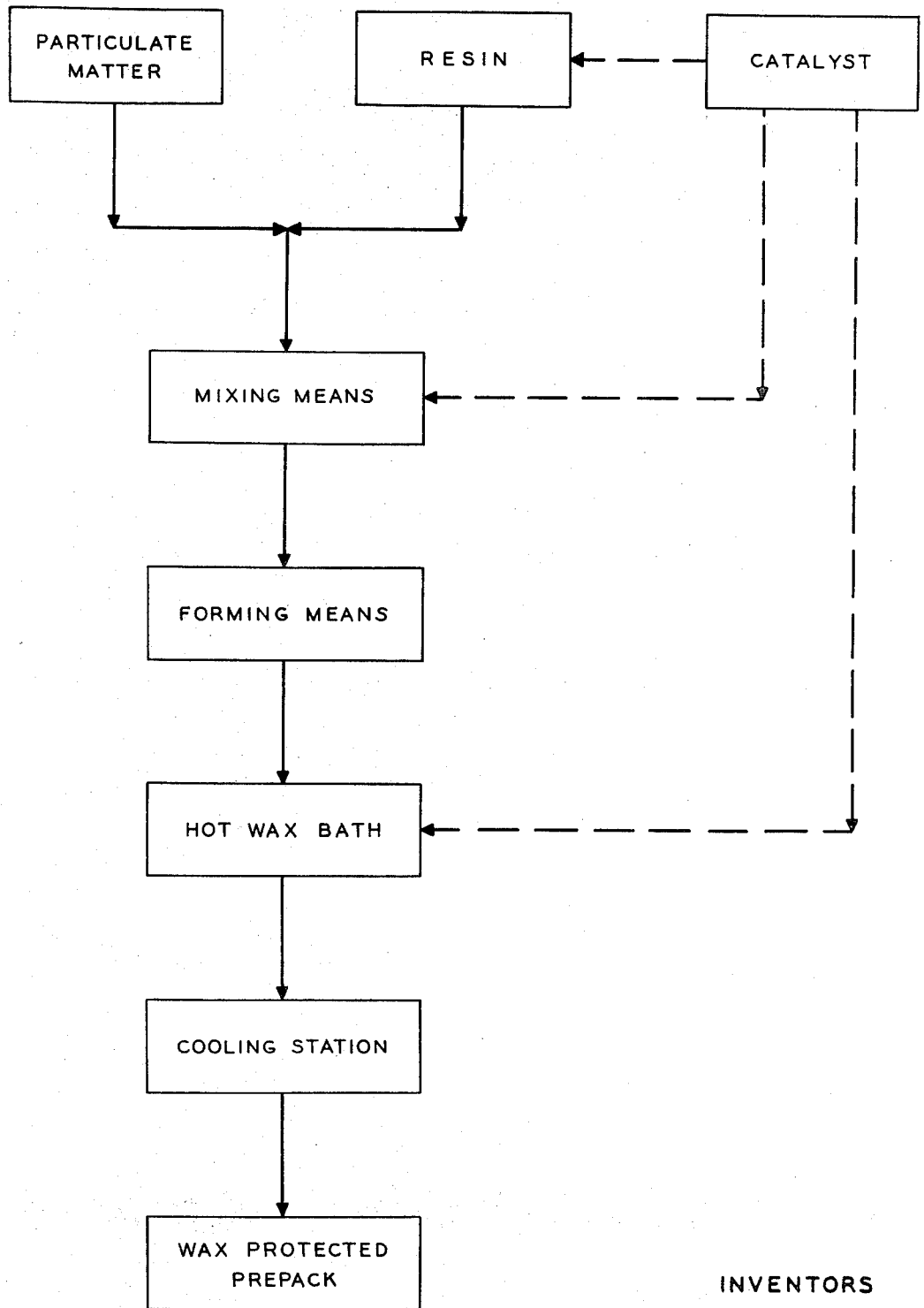
FIG. 3 is a flow diagram illustrating the preferred embodiment of the present invention.

In FIG. 3 a block flow diagram is used to schematically illustrate the steps of the preferred embodiment of the present invention. Particulate matter, such as sand, is provided in appropriate quantities in a suitable location. A wide range of particulate material and particle size distribution may be used in accordance with the present invention. Included as suitable material are sand grains, shells, glass beads, and the like. A preferred method for sizing the particulate matter for a porous matrix of a prepack is described and claimed in U.S. Pat. No. 2,905,245 issued Sept. 22, 1959 to C. L. DePriester. In that patent the permeable matrix is formed from grains sized in accordance with the grain size distribution of the formation in which the prepack is to be used. As pointed out, however, the present invention is not limited to use with any particular grain size distribution.

A thermosetting bonding material is provided for mixing with the particulate matter. The bonding material must be capable of adhering to the particulate matter used in forming the permeable matrix. Preferred bonding materials are the thermosetting resins. These resins are heat curable and generally undergo reaction with a suitable catalyst to set up the resin into a solid state to bind the grains of particulate matter together to form a porous matrix.

In carrying out the invention, therefore, there is used a bonding material which is the thermosetting type of resin. It is the type of resin which can undergo further reaction by treatment with a curing agent, such as a catalyst or cross-linking agent, which finally sets up the resin into the solid thermoset or insoluble, infusible state. Illustrations of such resinous materials are the partially polymerized or condensed resins such as phenol formaldehyde resins, urea formaldehyde, and melamine formaldehyde resins, which are finally cured by the reaction with a basic or acidic catalyst, such as formic acid, hydrochloric acid, oxalic acid, toluene sulfonic acid, trichloroacetic acid, quaternary ammonium compounds, primary and secondary amines, sodium hydroxide, sodium carbonate, potassium hydroxide, barium hydroxide and ammonia; ethylenically unsaturated alkyd resins, i.e., unsaturated polyesters, such as those derived from a polyhydric alcohol, and α,-β-ethylenically unsaturated aliphatic acid, such as a maleic, a portion of which is replaced, if desired, with a phthalic acid and/or a saturated aliphatic dibasic acid, and a monomer polymerizable therewith containing the group

in an amount, for example, of 40 to 80 percent based on it and unsaturated polyester; an example of such a resin would be unsaturated isophthalic polyester copolymerizable with styrene, the whole curable to the final solid state by treatment with a catalyst, such as a peroxy catalyst; epoxy resins, obtained by condensing epichlorohydrin with a polyhydroxy compound, the condensation product being finally cured to the solid, insoluble, infusible state by means of a curing cross-linking agent, such as an amine, a dicarboxylic acid anhydride or other resins, such as urea formaldehyde, and melamine formaldehyde.

The preferred bonding materials are the epoxy resins. The liquid epoxy resins suitable in the practice of the present invention are well known, and are commercially available, a common class being the diglycidyl ethers of bisphenol A, obtained by reacting epichlorohydrin with bisphenol A in the presence of caustic, such as sodium hydroxide or potassium hydroxide. In general, these materials may be represented by the formula:

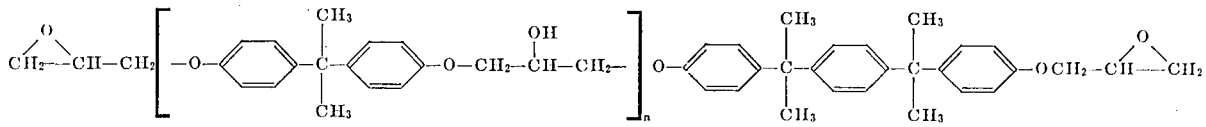

wherein n is zero or an integer of 1 or higher number.

Generally, the epoxy resins are obtained as mixture of monomeric epoxides ($n=0$) and of polymeric polyepoxides ($n=1$ or higher number). As is known in the art, by correlation proportions of epichlorohydrin and bisphenol A, and caustic, the degree of polymerization can be controlled accordingly. Thus, increasing the epichlorohydrin bisphenol A mol ratio, generally results in a mixture of polyepoxide having a lower average molecular weight. On the other hand increasing the mol ratio of sodium hydroxide to epichlorodin generally results in a mixture of higher average molecular weight. The most suitable liquid epoxy resins herein contemplated will have average molecular weights in about the range 350–450 and viscosities in about the range 500 to 20,000 centipoises at 76°F.

Also, as is known in the art, other halohydrins than epichlorohydrin, such as 1,2-dichloro-3 hydroxypropane, and dichlorohydrin, can be used.

Similarly in place of bisphenol A there can be used mononuclear di- and trihydroxy phenols, such as resorcinol, hydroquinone, pyrocatechol, and phloroglucinol; polynuclear polyhydroxy phenols, such as 4,4' dihydroxy diphenyl methane, trihydroxyl diphenyl dimethyl methane, and 4,4' dihydroxy biphenyl.

A particularly useful hydroxyl intermediate and the one preferred in carrying out the present invention are the polynuclear polyhydroxy phenols, also known as the Novolac resins. Novolac resins containing three to six, and as many as 12, phenolic hydroxyl groups per average molecule have been proposed in the preparation of the type of resin herein contemplated, the use of resins containing a higher number of functional groups being governed by the viscosity requirements hereinabove specified.

The Novolac resins are well-known substances, and many are available commercially. Their preparation is described in the literature, such as in the book Phenoplasts, 1947, page 29 et seq., by T. S. Carswell. In general, these resins are prepared by condensing phenol with an aldehyde in the presence of an acid catalyst. Proportions of phenol and aldehyde in mol ratios of phenol to aldehyde greater than 1.1 and up to 2.5 are taught. As the aldehyde, formaldehyde is preferred, although the use of other aldehydes, such as acetaldehyde, chloral, butyraldehyde and furfural is permissible.

Similarly known in the condensation reaction of the epichlorohydrin with the Novolac resin. The reaction is effected at a temperature in the range 140° to 300°F. between the Novolac resin and at least about 3 mols of epichlorohydrin for each phenolic hydroxyl equivalent of the Novolac resin, in the presence of about 1 mol of alkali metal hydroxide per phenolic hydroxyl equivalent of Novolac resin. When the reaction is complete, the epoxy resin is isolated from the reaction mixture by removal of alkali metal salt, of unreacted alkali, epichlorohydrin and water, and purified.

As above indicated, epoxy resins of the type herein contemplated are available commercially. For example, a suitable material available commercially can be represented as follows:

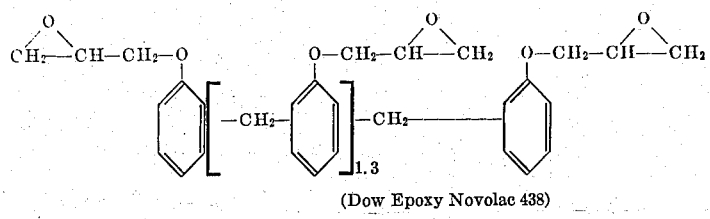

(Dow Epoxy Novolac 438)

As an additional example of a suitable material available commercially is the following:

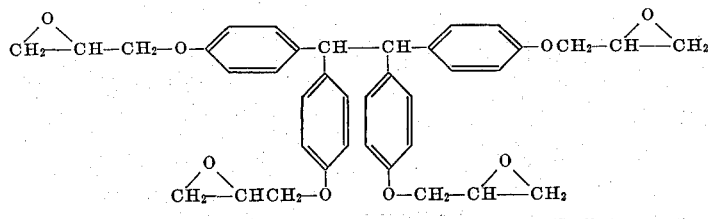

(Shell Epon 1031)

A slotted liner or an otherwise suitably formed member is provided to support the permeable matrix. The liner or member is connectable to a string of production tubing for the production of the well fluids through the permeable matrix and the tubing. The above-mentioned DePriester Patent has teaching directed to slot widths suitable for use with the method of the present invention. It is pointed out, however, that a great number of arrangements of supporting members are useful with the method of the present invention and this method is not to be restricted to any particular arrangement of slotted liners nor particulate matter.

In accordance with the invention a hot wax bath is used to polymerize the bonding material. In a preferred embodiment of the invention the wax used is petroleum wax. The petroleum waxes are soluble in oil and have relatively sharp melting points. In this regard it is desirable that the wax used be able to dissolve as well as melt in the downhole environment so that any melted portion of the coating which might be retained in the pores or other small openings of the permeable matrix of the prepack will dissolve in the oil there present. The melting temperatures of petroleum waxes range from about 100° to 210°F.

A particular petroleum wax useful in accordance with the present invention is microcrystalline wax. Microcrystalline wax is a term that covers a variety of non-paraffin waxes. The molecular weight of the microcrystalline waxes is in general greater than 500. Microcrystalline wax is especially advantageous for use with bonding material polymerizing at a temperature of about 140°F. because different feedstocks and different manufacturing processes will produce microcrystalline waxes with sharp melting points in the range of from about 140° to 210°F.

Microcrystalline wax is generally produced by treating a crude refinery petroleum or tank bottom wax with 150° a ketone such as methylethyl ketone, methylisobutyl ketone, or other solvent that dissolves the wax and filters out contaminants at approximately 150°F. When such a solution is chilled, microcrystals of wax separate and are removed by subsequent filtration.

Microcrystalline wax is also commonly produced from the bottoms of crude oil distillations. Microcrystalline is a term referring to the crystallinity index (CI) of a wax. The crystallinity index of microcrystalline wax ranges from 65 to 80. Included in the CI range are many naturally occurring microcrystalline waxes as well as waxes of animal or vegetable origins. It is preferred, however, to use the naturally occurring petroleum microcrystalline waxes in the present invention because the animal and vegetable waxes are less soluble in crude oil than the oil-derived waxes.

Petroleum waxes useful in lower temperature applications in accordance with the invention are the natural paraffin waxes which are available in small melting point increments from about 100° to 165°F. The molecular weights of paraffin waxes are generally less than 500. Natural paraffin wax is useful in applications ranging from about 100° to 170°F. Synthetic paraffin waxes and low molecular weight polyethylene are available with melting point increments from about 120° to 210°F. and above. These waxes are also adaptable for use in accordance with this invention.

The particulate matter, for example, sand and the heat curable thermosetting resin are mixed together. A preferred ratio of resin to sand is from about 3½ percent resin by weight to about 10 percent resin by weight. It has been found that ratios of less than 3½ percent by weight do not give adequate strength. Ratios of over about 10 percent do not improve the strength significantly to warrant use of additional resin. Depending on the characteristics of the resin used, a catalyst may be added to the resin at this time. With some resins, however, better results are obtained by adding the catalyst at a later stage. The mixture is formed in an appropriate manner with the slotted liner. For example, in the prepack illustrated in FIG. 2 the annular chamber is formed by the concentric liners and then the mixture of sand and resin is placed in the annular chamber.

The liner containing the resin and particulate matter is then placed in a molten wax bath. The wax bath has a temperature equal to the preferred curing temperature of the resin. The liner is left in the hot wax bath until a predeterminable curing period has elapsed. After this time has passed the wax bath is allowed to cool to a temperature just above the solidification temperature of the wax. The wax is viscous at this temperature and when the liner is removed from the bath the wax will remain in the interstices of the porous matrix. The liner is then allowed to cool further to allow the wax to harden. The resin has now been set up and the sand grains bonded together to form a wax saturated but otherwise permeable matrix about the liner. The interstices of the matrix contain solidified wax. The wax in the prepack in cooled and forms a protective coating around and in the interstices of the permeable matrix of the prepack.

Demonstrations have been run to show the effectiveness of the method of the present invention. In one set of demonstrations a 150 mesh sand was used as the particulate matter. An epoxy resin derived from the condensation of bisphenol A and epichlorohydrin was mixed with a diethylenetriamine catalyst to form the bonding material. The epoxy resin is generally represented by the formula:

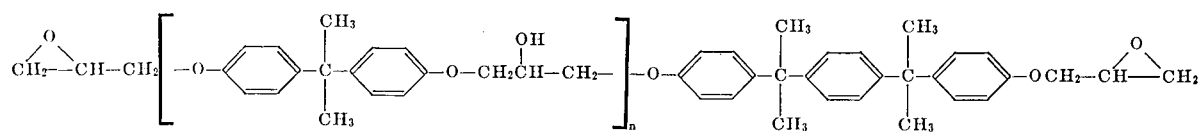

wherein $n$ is 0 or an integer of 1 or higher number. A wax bath was made from a paraffin wax having a melting point of 143° – 150°F. A pack was formed of sand grains and was mixed with resin and activator. The mixture was cured in a molten wax bath having a temperature of 180°F. After curing for about 16 hours the sand pack was removed from the partially cooled wax bath and allowed to cool to completely solidify the wax. The wax solidified to form a protective coating in the pack and on the exterior of the pack. The sand pack was cored to obtain samples. Compression tests and durability tests were run on the samples to determine the strength and durability of the consolidated pack. The results of the set of demonstrations following the above general outline are set out below.

DEMONSTRATION I

An epoxy resin of the above formulation with 8 parts per hundred diethylenetriamine (DETA) was used with 150 mesh sand. Seven percent by weight resin was mixed with the sand. The mixture was placed in hot wax at 180°F. and cured as discussed above. The results of compression tests are set out below:

| Sample No. | Percent Resin | Compressive Force, lbs. | Compressive Strength, psi |
| --- | --- | --- | --- |
| 1 | 7% | 2520 | 3210 |
| 2 | 7% | 2300 | 2930 |
| 3 | 7% | 2015 | 2570 |
| 4 | 7% | 2400 | 3070 |

The average compressive strength of the above cores is approximately 2,940 lbs.

DEMONSTRATION II

For comparative purposes a sand pack was also cured in a hot air environment in the conventional manner. The 150 mesh sand pack again comprised 7 percent by weight of the identical epoxy resin with 8 parts per hundred DETA. The mixture was cured for 16 hours in air at 180°F. simultaneously with the curing of the sand pack cured in wax as described above.

Compression tests of cores taken from these sand packs are set out below:

| Sample No. | Percent Resin | Compressive Force, lbs. | Compressive Strength, psi |
| --- | --- | --- | --- |
| 5 | 7% | 1600 | 2040 |
| 6 | 7% | above | 1980 |

The results of

The average compressive strength of the cores taken from the air-cured sand packs is about 2,010 psi.

DEMONSTRATION III

To illustrate the effect of a lower resin content on the strength of the permeable matrix a 150 mesh sand was mixed with resin of the above formulation and was cured in wax at 180°F. The samples contained 3 ½ percent by weight resin and 8 parts per hundred DETA.

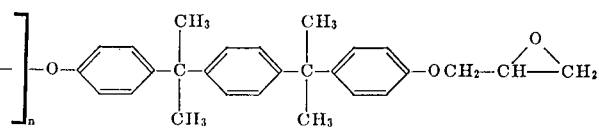

The results of compression tests are set out below:

| Sample No. | Percent Resin | Compressive Force, lbs. | Compressive Strength, psi |
| --- | --- | --- | --- |
| 7 | 3½ % | 1500 | 1900 |
| 8 | 3½% | 1650 | 2100 |

The average compressive strength of the samples is 2000 psi.

DEMONSTRATION IV

To show the effect of a larger concentration of resin 10 percent be weight samples of resin of the above formulation with 8 parts per hundred DETA and 150 mesh sand were mixed and cured. The results are set out below:

| Sample No. | Percent Resin | Compressive Force, lbs. | Compressive Strength, psi |
| --- | --- | --- | --- |
| 9 | 10% | 2500 | 3200 |
| 10 | 10% | 2350 | 3000 |

The average compressive strength was 3,100 psi.

DEMONSTRATION V

In the demonstrations set forth above the catalyst (DETA) was added to the resin while mixing the resin with the sand. It is in keeping with the invention however to contact the resin and the catalyst in the hot wax bath. This is particularly necessary and desirable where the particular resin used can be polymerized by catalyst in the absence of an elevated temperature. Thus 10 percent be weight epoxy resin of the above formulation was mixed with 150 mesh sand and the mixture placed in a hot wax bath. The wax bath had a 5 percent by weight concentration of dimethylaminopropyl amine as catalyst. The mixture was cured at 180°F. The results of compressive tests are set out below:

| Sample No. | Percent Resin | Compressive Force, lbs. | Compressive Strength, psi |
|---|---|---|---|
| 11 | 10% | 1680 | 2140 |
| 12 | 10% | 2150 | 2750 |

The average compressive strength is 2,445 psi. It is interesting to note that the wax used in the above demonstration initially had a melting point of from 143°F. to 150°F. The addition of the catalyst to the wax lowered the melting point to 128° to 138°F. This must be taken into account when selecting the wax for use as the protective coating. As taught in the above-mentioned copending application of Harry Brandt is is necessary that the wax have a melting temperature within limits set by the downhole temperature. Thus it is necessary to take into account when selecting a wax the change in melting temperature caused by adding a catalyst directly to the wax.

DEMONSTRATION VI

Another demonstration was conducted using 150 mesh sand and an epoxy resin of the above formulation mixed together and cured in a hot catalyst-containing wax bath. In this case the catalyst benzyl dimethyl amine was added in an amount of 2 percent by weight of the wax. The addition of the catalyst changed the melting temperature from 143° – 150°F. to 130° to 146°F. The mixture was cured as set out above and compressive tests made.

| Sample No. | Percent Resin | Compressive Force, lbs. | Compressive Strength, psi |
|---|---|---|---|
| 13 | 10% | 1530 | 1950 |
| 14 | 10% | 1200 | 1530 |
| 15 | 10% | 1150 | 1450 |

The average compressive strength is 1,620 psi.

The results of the above demonstrations show that a superior strength permeable matrix is formed when the resin is cured in a hot wax bath as opposed to a hot air cure. The method of this invention not only eliminates the necessity of the additional step of wax coating but also provides a permeable matrix for the prepack which has a superior strength. This is particularly important in oil field work where prepacks are subject to rough handling. It is also evident that a prepack of comparable strength can be made with much less resin using the method of the present invention than can a prepack be made by using the air cured method heretofore used. This results in an economic advantage since the resin is the most expensive component of the prepack liner.

Although only a few embodiments of the present invention have been described herein, the invention is not meant to be limited to these embodiments but only by the scope of the appended claims.

Having fully described our invention we claim:

1. A method of making the permeable portion of a prepacked sand control liner comprising the sequential steps of mixing a heat curable bonding material and particulate matter together in predeterminable amounts to form a permeable mixture, immersing the mixture in a liquid having a temperature at least as great as the curing temperature of the bonding material, flowing the said liquid into the pores of the permeable mixture, allowing the bonding material to cure to bond the particulate matter together to form a consolidated permeable portion for use in a prepacked sand control liner while maintaining the temperature of the liquid at at least the curing temperature of the bonding material to insure that the compressive strength of the resulting permeable portion is greater than if such portion was air cured at the same temperature and removing the now consolidated permeable portion from the liquid.

2. A method of making the permeable portion of a prepacked sand control liner comprising the sequential steps of mixing a heat curable bonding material and particulate matter together in predeterminable amounts to form a permeable mixture, immersing the mixture in a liquid wax bath having a temperature at least as great as the curing temperature of the bonding material, allowing the wax to enter the pores of the mixture and to cure the bonding material to bond the particulate matter together to form a consolidated permeable portion for use in a prepacked sand control liner while maintaining the temperature of the bath at at least the curing temperature of the bonding material to insure that the compressive strength of the resulting permeable portion is greater than if such portion was air cured at the same temperature, and allowing the liquid wax to solidify in the consolidated permeable portion.

3. A method of making a prepacked sand control liner comprising the sequential steps of mixing from 3 ½ percent to 10 percent by weight of a heat curable bonding material with sand particles to form an unconsolidated sand pack, forming the unconsolidated sand pack about a supporting member, immersing the portion of the supporting member containing the unconsolidated sand pack in a hot wax bath having a temperature at least as great as the curing temperature of the bonding material, allowing the hot wax to enter the pores of the unconsolidated sand pack to cure the bonding material to consolidate the sand pack to insure that the compressive strength of the sand pack is greater than if such pack was air cured at the same temperature, and allowing the hot wax in the consolidated sand pack to cool and harden to form a protective coating for the sand pack.

4. A method of making a prepacked sand control liner comprising the sequential steps of mixing a predeterminable amount of a heat curable resin with sand to form an unconsolidated sand pack, forming the sand pack about a slotted tubular member, immersing the portion of the tubular member containing the sand pack in a wax bath having a temperature in excess of 150°F, flowing the hot wax into the pores of the unconsolidated sand pack to cure the resin to consolidate the sand pack to insure that the compressive strength of the sand pack is greater than if such pack was air cured at the same temperature, allowing the wax in the sand pack to partially cool and to become viscous, and then removing the tubular member and the sand pack consolidated thereabout from the wax bath.

5. The method of claim 4 where the resin is an epoxy resin.

6. The method of claim 4 where the resin is between 3 ½ percent to 10 percent by weight of the unconsolidated sand pack.

7. The method of claim 4 further characterized by adding a catalyst to the resin.

8. The method of claim 7 where the catalyst for the resin is added to the hot wax bath.

9. A method of making a prepacked sand control liner comprising the sequential steps of mixing a heat curable resin selected from the group consisting of the formaldehyde resins, the polyester resins, and the epoxy resins with sand to form a permeable mixture, placing the mixture in hot liquid wax having a temperature in excess of 150°F, and flowing the hot wax into the pores of the permeable mixture to cure the resin and consolidate the sand to form a consolidated permeable matrix having a compressive strength greater than would be the case if such matrix was air cured at the same temperature, and allowing the wax to cool and harden in the pores of the consolidated permeable matrix.

10. The method of claim 9 where the resin is about 3 ½ to 10 percent by weight.

11. The method of claim 9 where a catalyst is added to the resin.

12. The method of claim 11 where the resin catalyst is added to the hot liquid wax.

13. The method of claim 12 where the catalyst is at least 2 percent by weight of the wax.

14. The method of consolidating a sand pack comprising the sequential steps of mixing 3 ½ to 10 percent by weight epoxy resin and sand together to form a unconsolidated mixture, placing the mixture in a liquid wax bath having a temperature above 150°F., allowing the liquid wax to enter the pores of the unconsolidated mixture to cure the resin to consolidate the sand pack to insure that the compressive strength of the sand pack is greater than if such pack was air cured at the same temperature, allowing the wax to partially cool, and then removing the consolidated sand pack and the wax contained thereabout from the wax bath.

15. The method of claim 14 further characterized in that a catalyst for the resin is added to the epoxy resin prior to mixing the resin and the sand.

16. The method of claim 14 further characterized in that at least 2 percent by weight catalyst for the epoxy resin is added to the hot wax bath before placing the mixture of sand and resin in the bath.

* * * * *